United States Patent
Mock et al.

(10) Patent No.: US 8,058,826 B2
(45) Date of Patent: Nov. 15, 2011

(54) MOTOR CONTROLLER WITH HALL SENSOR OUTPUT MISALIGNMENT COMPENSATION USING DELAYED OR SHIFTED COMMUTATION

(75) Inventors: M. Robert Mock, Midway, UT (US); Raymond Y. Liu, Monterey Park, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 524 days.

(21) Appl. No.: 12/164,888

(22) Filed: Jun. 30, 2008

(65) Prior Publication Data

US 2009/0322267 A1    Dec. 31, 2009

(51) Int. Cl.
*H02P 6/10* (2006.01)
(52) U.S. Cl. .......... 318/400.21; 318/254.1; 318/439; 318/438; 318/139
(58) Field of Classification Search .......... 318/400.21, 318/254.1, 439, 438, 139
See application file for complete search history.

(56) References Cited

U.S. PATENT DOCUMENTS

| | | | |
|---|---|---|---|
| 5,164,622 A | | 11/1992 | Kordik |
| 6,051,943 A | * | 4/2000 | Rabin et al. .......... 318/400.09 |
| 6,239,564 B1 | * | 5/2001 | Boe et al. .......... 318/400.21 |
| 6,826,499 B2 | | 11/2004 | Colosky et al. |
| 6,850,022 B2 | * | 2/2005 | Liu et al. .......... 318/400.34 |
| 6,891,343 B2 | | 5/2005 | Petersen |
| 6,993,439 B2 | * | 1/2006 | Grosjean .......... 702/66 |
| 6,995,679 B2 | | 2/2006 | Eskritt et al. |
| 7,026,773 B2 | | 4/2006 | Petersen |
| 7,262,570 B2 | * | 8/2007 | Alberkrack et al. .......... 318/400.38 |
| 7,423,396 B2 | * | 9/2008 | Bolt .......... 318/400.38 |
| 2003/0034751 A1 | | 2/2003 | Walters |
| 2005/0156556 A1 | | 7/2005 | Hermann et al. |
| 2005/0275361 A1 | | 12/2005 | Bolt |

FOREIGN PATENT DOCUMENTS

| | | |
|---|---|---|
| DE | 3424247 A1 | 1/1986 |
| WO | 01/26212 A | 4/2001 |
| WO | 10 2007 046242 A1 | 4/2007 |
| WO | 2007/119094 A | 10/2007 |

OTHER PUBLICATIONS

U.S. Appl. No. 11/850,999, filed Sep. 6, 2007.
Yedamale, Padmaraja; Microchip Technology, Inc., "Brushless DC (BLDC) Motor Fundamentals," Microship AN885, 2003.

* cited by examiner

*Primary Examiner* — Walter Benson
*Assistant Examiner* — David S Luo
(74) *Attorney, Agent, or Firm* — BainwoodHuang

(57) ABSTRACT

In a normal operating mode, a motor controller provides motor drive current to windings of a motor based on sensor signals to drive the windings in a normal commutation sequence, and monitors for occurrence of a motor stall condition. Upon detecting the motor stall condition in a given commutation state, then in a first driving step, the windings are momentarily driven according to an advanced commutation state, and during the first driving step, a reverse transition of the sensor signals to a state corresponding to a preceding commutation state is detected. Upon completion of the first driving step when such a reverse transition of the sensor signals is detected, then in a second driving step the windings are driven according to the preceding commutation state until a forward transition of the sensor signals is detected, and in a third driving step the windings are momentarily continued to be driven according to the same commutation state notwithstanding the forward transition of the sensor signals before normal operation is resumed.

8 Claims, 4 Drawing Sheets

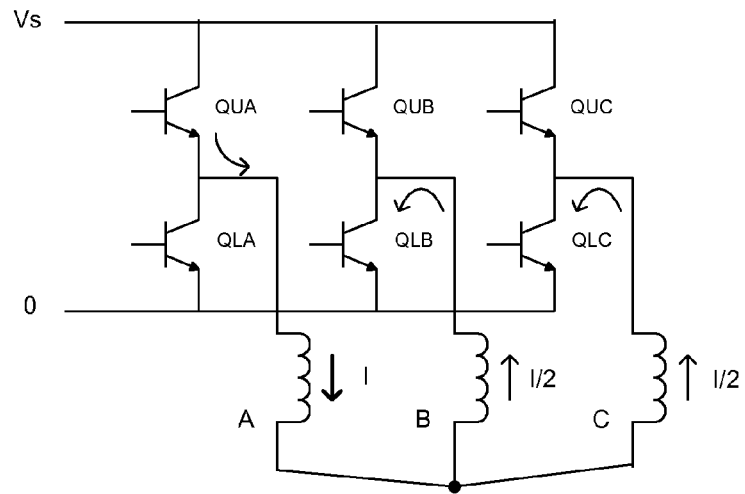
Fig. 7
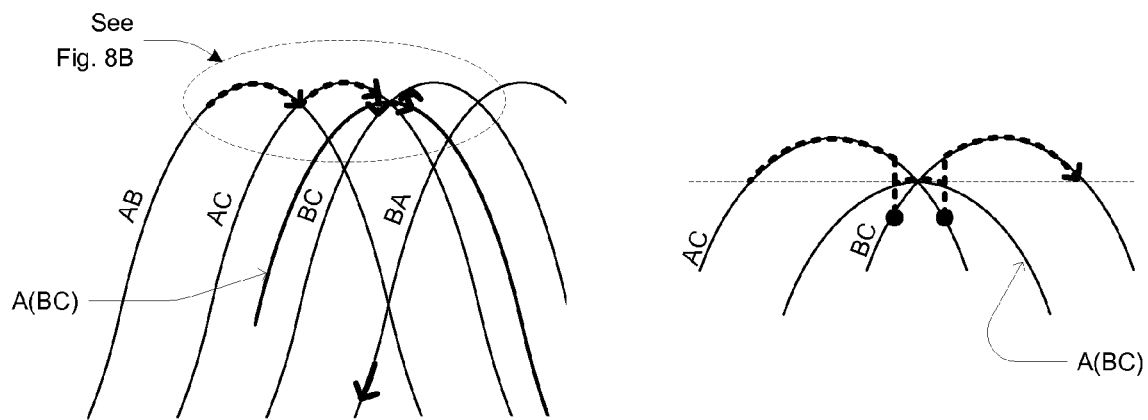
Fig. 8A
Fig. 8B

MOTOR CONTROLLER WITH HALL SENSOR OUTPUT MISALIGNMENT COMPENSATION USING DELAYED OR SHIFTED COMMUTATION

BACKGROUND

In so-called brushless direct-current (BLDC) motors, motor rotation is caused by electronic switching or "commutation" of drive current among a plurality of motor windings. The commutation induces a rotating component to the overall magnetic field associated with the windings, and the interaction of this rotating magnetic field component with the rotor's permanent magnets causes rotation of the rotor. In one example, one common BLDC configuration employs three windings offset from each other by 120 degrees of electrical phase.

Commutation can be performed in many different ways. A set of motor position sensors such as Hall-effect magnetic sensors are arranged about the motor rotational axis with a precise spacing. As the rotor rotates, the permanent magnets rotate, causing the output of each Hall-effect sensor switches in a binary fashion. The collective outputs of the sensors are used to control commutation. In one simple arrangement, three sensors offset from each other by nominally 120 electrical degrees are used. Each of six distinct sets of the three binary outputs of the sensors maps directly to a corresponding commutation state in which a particular pair of the motor windings is driven with current with a particular polarity. Thus commutation occurs precisely at the time that the binary output from one of the sensors switches from one binary state to the other. Ideally, the sensors are located such that this transition occurs exactly midway between two successive peaks of a torque characteristic of the motor, so that the value of the torque at this "valley" location is as high as possible. This ideal configuration provides the highest minimum torque value which may be especially needed to maintain proper operation under high load conditions.

U.S. Pat. No. 6,239,564 of Boe et al. discloses a motor controller that senses an impending motor stall accompanied by magnetic saturation of the energized windings and advances the commutation state to the next succeeding state in advance of the corresponding transition of the Hall-effect sensors. Boe et al. describe this operation as increasing the torque to the motor to enable it to stay out of the stall condition.

SUMMARY

A method is disclosed of compensating for higher amplitude motor torque ripples due to misalignment of motor Hall-effect sensor outputs. In a square wave motor the Hall-effect sensor outputs are used to control motor current commutation. By use of the disclosed method, motor stall conditions due to deeper than normal torque ripples caused by misaligned Hall-effect sensor outputs can be overcome by momentarily altering the driving of the motor windings in ways that provide greater torque than is provided by the normal driving of the windings as dictated by the sensor signals from the Hall-effect sensors. This ability to overcome certain stall conditions can provide for improved overall performance of a motor-based system.

The disclosed method includes, in a normal operating mode, providing motor drive current to the windings based on the Hall-effect sensor signals such that the windings are driven in a normal commutation sequence corresponding to a sequence of states of the sensor signals. The method further includes shifting the commutation sequence upon occurrence of a motor stall condition. Specifically, in a first driving step, the windings are momentarily driven according to an advanced commutation state, and during the first driving step a reverse transition of the sensor signals to a state corresponding to a preceding commutation state is detected. Upon completion of the first driving step when the reverse transition of the sensor signals has been detected, then (a) in a second driving step the windings are driven according to the preceding commutation state until a forward transition of the sensor signals is detected, and (b) in a third driving step the windings are continued to be driven according to the same commutation state notwithstanding the forward transition of the sensor signals, before normal operation is resumed. In this manner, the stall caused by premature transition of the Hall-effect sensor signals can be avoided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 7 is a schematic diagram of motor winding driver circuitry; and

FIGS. 8A and 8B are waveform diagrams depicting additional operations of a motor system.

DETAILED DESCRIPTION

Figure 1:
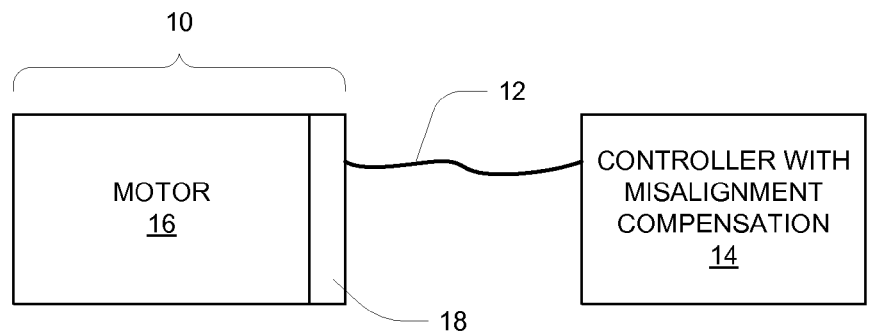
FIG. 1 is a block diagram of a motor system according to one embodiment.

FIG. 1 shows a system having a motor assembly 10 coupled by a wiring harness 12 to a controller 14. The motor assembly 10 includes a motor 16 such as a brushless DC motor, and a sensor assembly 18 affixed to one end of the motor 16. One end of the wiring harness 12 terminates on the sensor assembly 18.

The controller 14 controls the operation of the motor 10, specifically its rotational position and/or speed and/or torque depending on the application. In one application, the motor 16 is part of an electromechanical actuator utilized to control the position of a mechanical component, such as a flight surface in aerial projectile or aircraft. The controller 14 monitors the rotational position of the motor 16 via Hall-effect sensors located on the sensor assembly 18 and controls the flow of current to the windings of the motor 16 to achieve a desired motor position and/or speed and/or torque for a desired actuator movement. Different types of motor control arrangements and techniques may be utilized in different embodiments, including specific circuitry for controlling winding currents. The present description is primarily concerned with recovering from a motor stall condition that is caused in part by inaccurate motor position information caused by misalignment of the individual position sensors on the sensor assembly 18.

Figure 2:
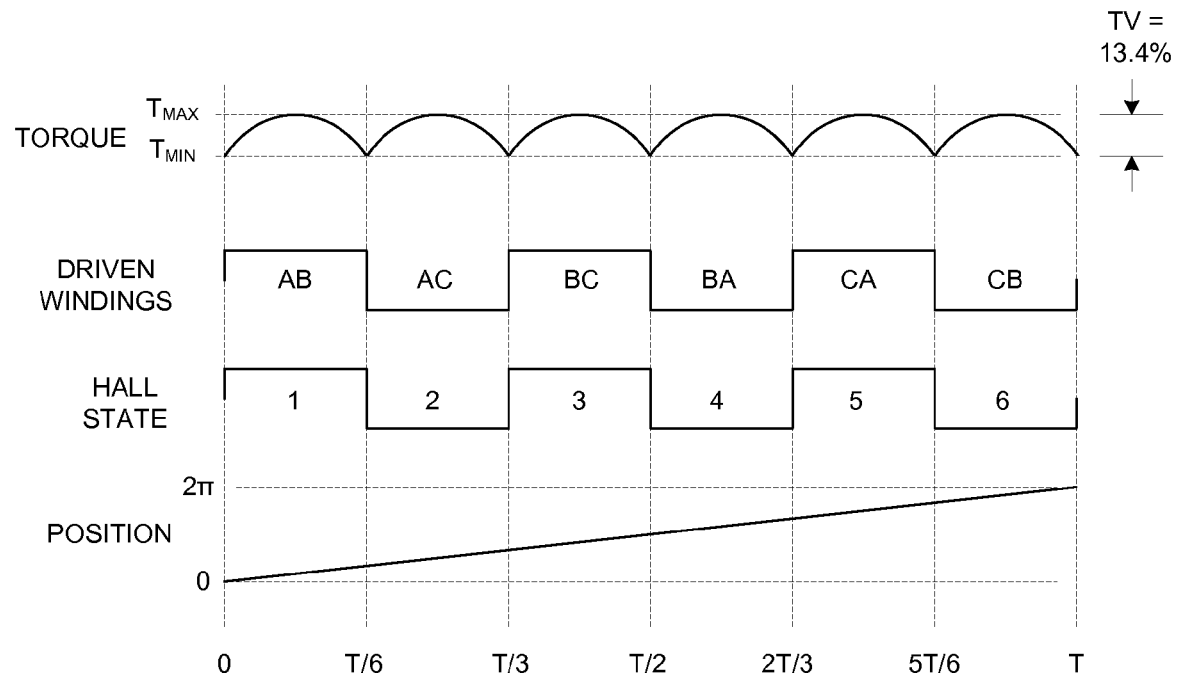
FIG. 2 is a waveform diagram depicting a normal operating mode of the motor system.

FIG. 2 depicts operation of the motor 16 under normal operating conditions. One electrical rotation from 0 to $2\pi$ radians is shown. The number of electrical rotations per mechanical rotation is dependent on the number of permanent magnet pole pairs in a particular motor design. The motor is assumed to have three phase windings labeled A, B and C. The windings are driven pair-wise in operation through six commutation states or commutation intervals during each electrical revolution as generally known in the art. The sequence of commutation states, also called a "commutation sequence", is shown as AB, AC, BC, BA, CA and CB in the illustrated embodiment. The timing of the commutation sequence is determined by the motor rotational position as indicated by the output signals of the Hall-effect sensors, which are indicated by the sequence of "Hall states" 1 through 6. Those skilled in the art will appreciate that the Hall states 1-6 may correspond to different combinations of binary states of the outputs of three Hall-effect sensors arranged at intervals of $2\pi/3$ radians about the rotational axis, in one embodiment. Time in FIG. 2 is indicated by fractions of the motor rotation period T.

Also shown in FIG. 2 is a plot of the typical character of the motor torque, which results from summing the rectified portions of the active phase voltages (back EMF). The torque exhibits ripple with a magnitude shown as a "torque valley" (TV), which has the value of 13.4% in the illustrated embodiment. This value represents the relative difference between the minimum torque value $T_{MIN}$ (trough at the commutation points between commutation intervals) and the maximum torque value $T_{MAX}$ (peak at the middle of each commutation interval). Thus if $T_{MAX}$ has a normalized value of 1 torque unit, for example, then the $T_{MIN}$ has a normalized value of 0.866 units.

In operation, the controller 14 of FIG. 1 utilizes the position information from the Hall-effect sensors in order to effect commutation of the motor windings to maintain motor rotation. When the motor 16 is in a range of positions corresponding to Hall state 1, for example (e.g. 0 to $\pi/3$ radians, electrical), then the controller 14 drives the winding pair AB. When the Hall-effect sensor signals transition to Hall state 2, the controller 14 switches or "commutates" the driving current to windings AC, etc. Thus in the normal operating mode, the driving of the motor windings is determined by the motor position information as indicated by the Hall-effect sensor signals.

Figure 3A:
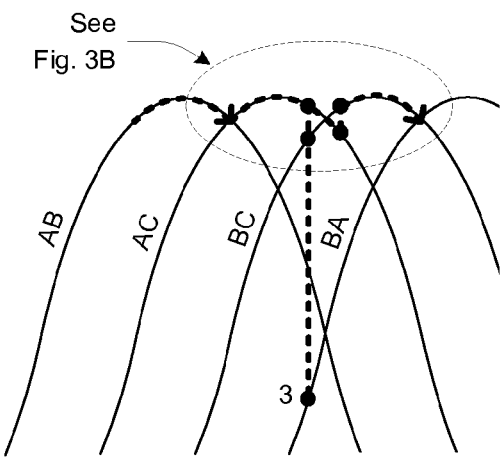
FIGS. 3A-3B, 4A-4B and 5A-5B are waveform diagrams depicting various operations of a motor system.
Figure 3B:
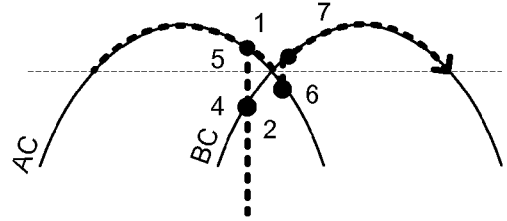

FIGS. 3A and 3B illustrate an operational situation which occurs when the Hall-effect sensors are misaligned with respect to the motor (rotor magnet position relative to stator position), specifically when such misalignment causes an early transition of the signals relative to the actual motor rotor position. In these Figures, fuller torque profiles of each commutation interval are shown and labeled accordingly. In the example of FIG. 3A, the motor is operating in commutation interval AC when a premature transition of the sensor signals occurs (due to Hall-effect sensor misalignment), causing operation to shift from point 1 on the AC curve to point 2 on the BC curve (see FIG. 3B) according to the normal operating mode. It is assumed that the torque at point 2 is insufficient to drive the load, resulting in a stall (note that the torque at point 2 is less than $T_{MIN}$). It will be appreciated that a similar problem can occur when misalignment results in a late transition of the sensor signals relative to actual motor rotor position. In that case, the motor reaches a position on the right part of the AC curve well below the torque valley without commutation having yet occurred, and a stall can then occur.

Overall, the controller 14 employs a technique of momentarily advancing commutation and then delaying commutation (if necessary) to overcome a stall. The technique is based on the assumption that either the advance or delay will move operation to a higher torque value and overcome the stall, after which normal operation can resume. In the example of FIGS. 3A and 3B, when a stall is detected at point 2, the controller 14 first enters a driving state in which it momentarily advances commutation, which means that it drives the windings according to the next successive commutation state after the present or normal commutation state dictated by the present values of the Hall-effect sensor signals. In this situation the commutation state has already transitioned to BC due to sensor misalignment, and so the momentary advance moves operation to point 3 of the BA curve (see FIG. 3A), which is a point of very low torque insufficient to overcome the stall. In this particular example, it is assumed that the motor and its drive-train require a considerable amount of back-driving force for reverse rotation, such that the motor position does not change during this momentary driving in an advance state. The stall persists.

Following this momentary advance, operation returns to point 4 on the BC curve. Assuming the stall is not yet overcome, then at this time the controller 14 enters a driving state in which it momentarily delays commutation in a further attempt to overcome the stall. In this case operation moves to point 5 on the preceding curve (AC), and indeed the torque is now much higher. Assuming that the torque is sufficiently high, the motor resumes rotating from operating point 5 to point 6, at which point the momentary delay of commutation is ended and normal operation resumes. At operating point 6 the Hall-effect sensors indicate that commutation should be in state BC, and thus operation moves to point 7 on the BC curve and then onward in the normal operating sequence as dictated by the controller 14 according the Hall-effect sensor signals.

Figure 4A:
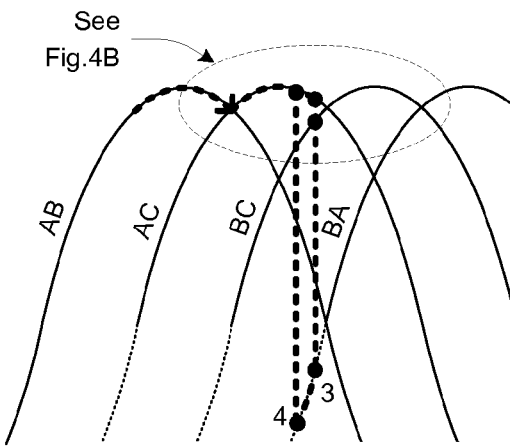
Figure 4B:
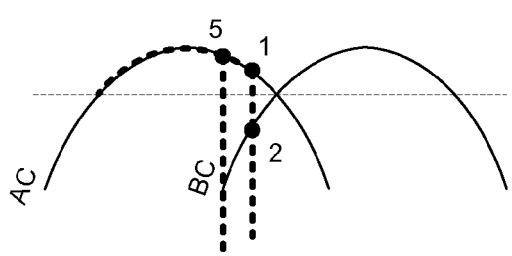

FIGS. 4A and 4B illustrate a potential pitfall with the above-described process that can occur under certain conditions. The initial operation is as described above up to the momentary advance of commutation and operating point 3. However, it is now assumed that the motor does not maintain a constant position but rather rotates slightly backward, such as can occur if there is a sufficiently high back-driving force. In this case, during this momentary advance the motor operation moves to point 4 (FIG. 4A), further down the BA curve, before operation returns to point 5 on the AC curve. Assuming that the controller 14 subsequently tries to resume normal motor operation from point 5, it again reaches operating point 1 at which the early commutation forces it back to operating point 2, potentially leading to another stall. It will be appreciated that the motor could operate for many cycles or even indefinitely in the loop from operating points 1-5 and never resume normal forward movement.

Figure 5A:
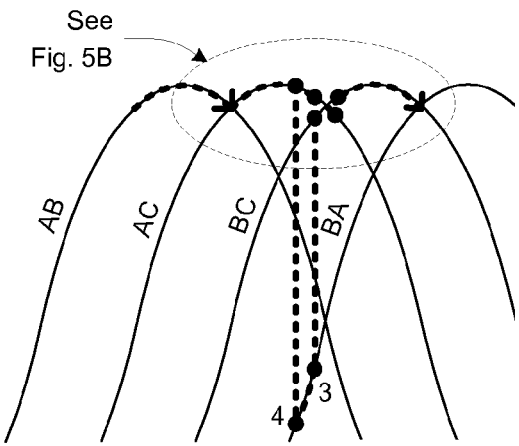
Figure 5B:
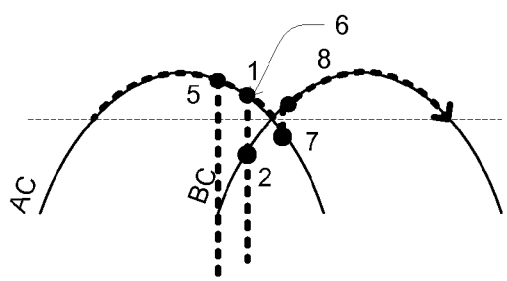

FIGS. 5A and 5B illustrate a refined method that avoids the problematic operation illustrated in FIGS. 4A-4B. During the momentary advance phase of operation (points 3 to 4), the backwards rotation of the motor should result in a transition of the Hall-effect sensor signals in the wrong direction (i.e., from commutation state BC to state AC). When the controller 14 detects this reverse transition, commutation is returned to the normal state and then further commutation is delayed so as to avoid operating point 2 and the stall that can occur there. Specifically, upon completion of the advance phase when the reverse transition of the sensor signals has been detected, then (a) the windings are driven according to the normal commutation state until a forward transition of the sensor signals occurs (e.g., operation from points 5 to 6), and (b) the windings are momentarily driven according to the same commutation state (i.e., commutation is delayed) notwithstanding the forward transition of the sensor signals, and normal commutation is subsequently resumed after this momentary period. In the example of FIGS. 5A and 5B, this is illustrated by operation proceeding from point 6 to point 7 (still on the AC curve) and then transitioning to point 8 on the BC curve.

Figure 6:
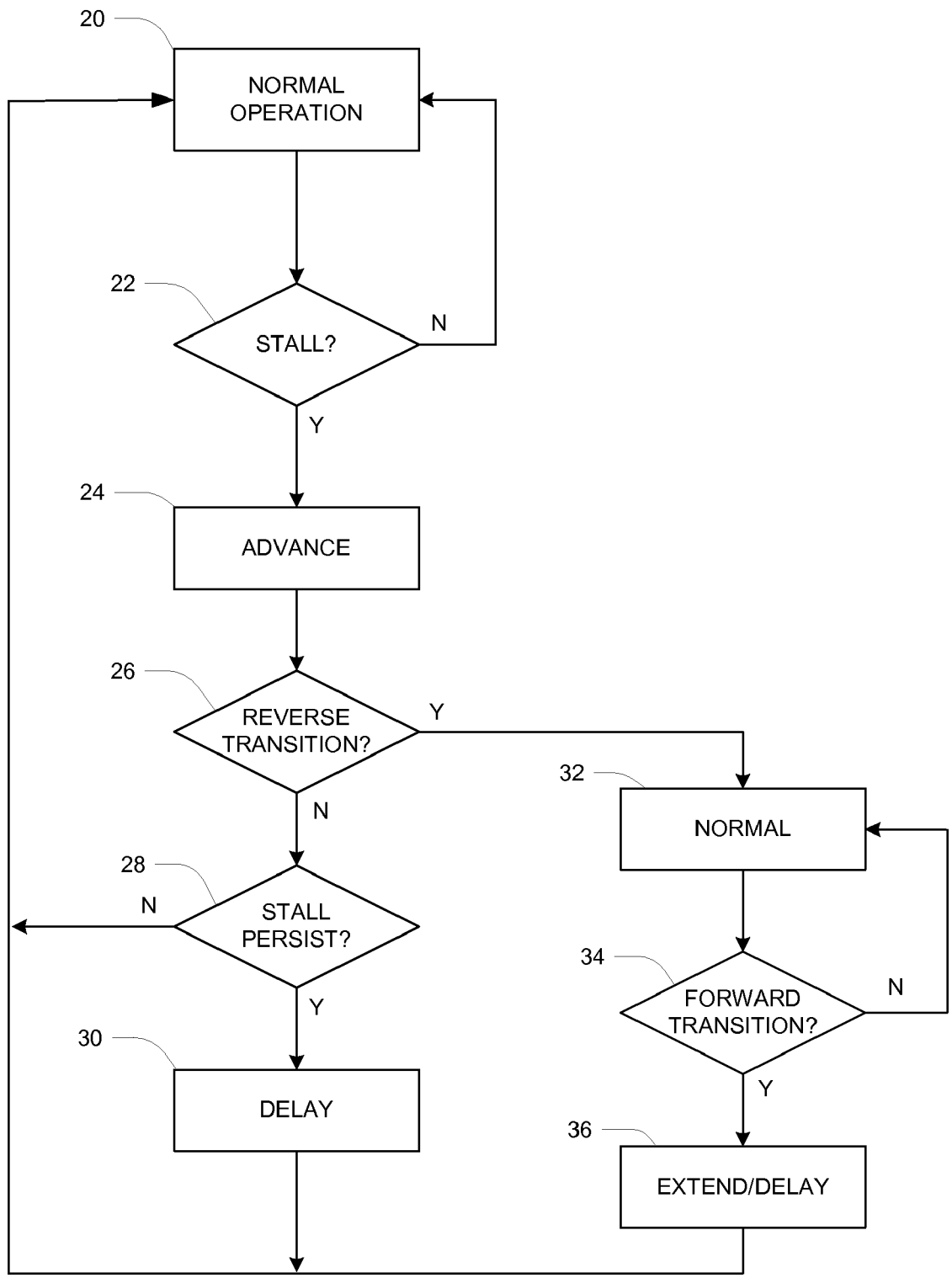
FIG. 6 is a flow diagram of a method performed by a motor controller in the motor system.

FIG. 6 is a flow diagram of the above operation. In step 20, normal operation occurs and the controller 14 permits commutation to follow the states of the Hall-effect sensor signals (such as illustrated in FIG. 2). In step 22, a stall is detected, and in step 24 the controller 14 enters an advance state and momentarily drives the windings according to an advanced commutation state. In step 26 the controller 14 detects whether a reverse transition of the Hall-effect sensor signals occurs during the momentary advance state (i.e., a transition to states corresponding to the commutation state preceding the present commutation state in the commutation sequence). If not, then it is assumed that the motor position is holding such as shown in FIGS. 3A and 3B, and the controller proceeds to step 28 in which it tests whether the motor is still stalled. If not, then normal operation is resumed at step 20. If so, then in step 30 the controller 14 causes a momentary delay of commutation in an attempt to overcome the stall (this operation corresponds to the transition to operating point 5 in the example of FIGS. 3A and 3B), and then normal operation is resumed at step 20.

If at step 26 a reverse transition of the Hall-effect sensor signals is detected, this is an indication that there is a risk of the operational situation of FIGS. 4A and 4B occurring, and thus additional steps are taken in an attempt to avoid it. At step 32 commutation is returned to normal until a forward transition of the Hall-effect sensor signals is detected at step 34 (corresponding to operating point 6 in the example of FIGS. 5A and 5B above). Upon that occurring, at step 36 the controller 14 momentarily extends the current driving state (momentarily delays commutation), giving the motor a chance to rotate past the stall point before resuming normal commutation (corresponding to the transitions from point 1 to 7 and 7 to 8 in the example of FIGS. 5A and 5B).

FIGS. 7, 8A and 8B illustrate another technique which can be used, either by itself or in conjunction with the above-described and other techniques, to overcome motor stalls caused by the misalignment of Hall-effect sensors. FIG. 7 shows the connections among three motor windings labeled A, B and C and six transistors QUA, QLA, etc. The transistors are controlled by a controller such as controller 14 (not shown in FIG. 7).

In a typical prior art arrangement (such as described above with reference to FIG. 2), only one upper transistor (QUA, QUB, or QUC) and one lower transistor (QLA, QLB, or QLC) are "on" or conducting at a given time. The six possible combinations of conducting states correspond to the above-described six commutation states AB, AC, etc. Thus in normal operation only two motor windings are energized at a time, with current flowing in one direction through one of the windings and in the other direction in the other winding.

FIG. 7 illustrates an additional operating mode which can be employed to momentarily alter the torque of the motor and overcome a stall. In particular, all three windings are energized at the same time, with current flowing in one direction through one of the windings (e.g. winding A via transistor QUA) and in the other direction through the other two windings (e.g. windings B and C via transistors QUB and QUC respectively). This pattern of driving the windings is different from the driving patterns found in the normal commutation sequence. In the illustrated example, this arrangement corresponds to a torque curve shown as "A(BC)" as shown in FIGS. 8A and 8B. It will be observed that the peak of this curve occurs in the vicinity of the trough between the AC and BC curves, and it has a higher value than the BC curve to the left of the trough and the AC curve to the right of the trough. Thus, in the case of either an early or a late commutation caused by misalignment, the controller 14 can momentarily switch to the A(BC) operation of FIG. 7 to temporarily obtain higher torque and overcome the stall.

It may be advantageous when employing the technique of FIG. 7 to also temporarily boost the overall current so that the entire torque curve A(BC) is shifted upward slightly to provide even greater torque to better ensure that the stall is overcome.

While various embodiments of the invention have been particularly shown and described, it will be understood by those skilled in the art that various changes in form and details may be made therein without departing from the spirit and scope of the invention as defined by the appended claims. In particular, it is noted that the disclosed technique may be utilized with other than 3-phase motors, for example motors having 4, 5 or more phases.

What is claimed is:

1. A method of compensating for misalignment of Hall-effect sensors that generate sensor signals providing motor position information to control commutation of motor drive current through windings of a motor, comprising:

in a normal operating mode, (1) providing motor drive current to the windings based on the sensor signals such that sets of the windings are driven in a normal commutation sequence corresponding to forward rotation of the motor and a sequence of states of the sensor signals, and (2) monitoring for occurrence of a motor stall condition; and upon detecting the motor stall condition with the sensor signals in a given sensor signal state that in the normal operating mode results in driving the windings according to a corresponding given commutation state:

(1) in a first driving step, momentarily driving the windings according to an advanced commutation state, the advanced commutation state following the given commutation state in the normal commutation sequence, (2) during the first driving step, detecting a reverse transition of the sensor signals to a preceding sensor signal state which precedes the given sensor signal state in the sequence of states of the sensor signals, and (3) upon completion of the first driving step when the reverse transition of the sensor signals has been detected, (a) in a second driving step driving the windings according to a preceding commutation state until the sensor signals are again detected to be in the given sensor signal state, the preceding commutation state preceding the given commutation state in the normal commutation sequence, and (b) in a third driving step momentarily continuing to drive the windings according to the preceding commutation state notwithstanding the sensor signals' being in the given sensor signal state.

2. A method according to claim 1, further comprising:

during the first driving step, detecting no reverse transition of the sensor signals, and consequently:

(1) detecting whether the motor stall condition persists;

(2) if the motor stall condition does not persist, then returning to the normal operating mode; and (3) if the motor stall condition does persist, then momentarily driving the windings according to the preceding commutation state.

3. A method according to claim 1, further comprising:
upon detecting the occurrence of the motor stall condition, temporarily driving the windings according to a pattern different from driving patterns of the normal commutation sequence, the pattern having a torque peak in the vicinity of a torque trough of the normal commutation sequence, the pattern including one winding being driven in a given direction and two other windings being driven in an opposite direction.

4. A method according to claim 3, further comprising temporarily boosting the current provided to the windings while driving the windings according to the pattern.

5. A system, comprising:
a motor including a plurality of Hall-effect position sensors that generate sensor signals providing motor position information; and
a motor controller operative to control commutation of motor drive current through windings of the motor while compensating for misalignment of the Hall-effect position sensors, the motor controller being operative:
in a normal operating mode, (1) to provide motor drive current to the windings based on the sensor signals such that sets of the windings are driven in a normal commutation sequence corresponding to forward rotation of the motor and a sequence of states of the sensor signals, and (2) to monitor for occurrence of a motor stall condition;
upon detecting the motor stall condition with the sensor signals in a given sensor signal state that in the normal operating mode results in driving the windings according to a corresponding given commutation state, (1) in a first driving step, to momentarily drive the windings according to an advanced commutation state, the advanced commutation state following the given commutation state in the normal commutation sequence, (2) during the first driving step, to detect a reverse transition of the sensor signals to a preceding sensor signal state which precedes the given sensor signal state in the sequence of states of the sensor signals, and (3) upon completion of the first driving step when the reverse transition of the sensor signals has been detected, (a) in a second driving step to drive the windings according to a preceding commutation state until the sensor signals are again detected to be in the given sensor signal state, the preceding commutation state preceding the given commutation state in the normal commutation sequence, and (b) in a third driving step to momentarily continue to drive the windings according to the preceding commutation state notwithstanding the sensor signals' being in the given sensor signal state.

6. A system according to claim 5, wherein the motor controller is further operative, during the first driving step, to detect no reverse transition of the sensor signals, and consequently:
(1) to detect whether the motor stall condition persists;
(2) if the motor stall condition does not persist, then to return to the normal operating mode; and
(3) if the motor stall condition does persist, then to momentarily drive the windings according to the preceding commutation state.

7. A system according to claim 5, wherein the motor controller is further operative, upon detecting the occurrence of the motor stall condition, to temporarily drive the windings according to a pattern different from driving patterns of the normal commutation sequence, the pattern having a torque peak in the vicinity of a torque trough of the commutation sequence, the pattern including one winding being driven in a given direction and two other windings being driven in an opposite direction.

8. A system according to claim 7, wherein the motor controller is further operative to temporarily boost the current provided to the windings while driving the windings according to the pattern.

* * * * *